(12) United States Patent
Bury

(10) Patent No.: US 7,801,572 B2
(45) Date of Patent: Sep. 21, 2010

(54) DEVICE CRADLE EQUIPPED WITH MOVING PLUG

(75) Inventor: Henryk Bury, Mielec (PL)

(73) Assignee: Bury Sp. Z o.o., Mielec (PL)

( * ) Notice: Subject to any disclaimer, the term of this patent is extended or adjusted under 35 U.S.C. 154(b) by 638 days.

(21) Appl. No.: 11/687,634

(22) Filed: Mar. 17, 2007

(65) Prior Publication Data

US 2007/0293277 A1    Dec. 20, 2007

(30) Foreign Application Priority Data

Mar. 17, 2006    (DE) .................. 10 2006 012 763

(51) Int. Cl.
*H04M 1/00* (2006.01)
(52) U.S. Cl. .............. 455/569.1; 455/575.1; 455/575.9; 455/569.2; 455/347; 379/446; 379/433.01; 379/455; 379/449
(58) Field of Classification Search .......... 455/100, 455/569.1, 569.2, 575.1, 575.8, 575.6, 95, 455/90.3, 550.1, 128, 346–348, 573, 403, 455/351, 575.9; 379/455, 426, 447, 420.01, 379/446, 443.05, 433.06, 433.11, 433.12, 379/433.13, 449
See application file for complete search history.

(56) References Cited

U.S. PATENT DOCUMENTS

| | | | |
|---|---|---|---|
| 5,825,874 A * | 10/1998 | Humphreys et al. | 379/446 |
| 6,171,127 B1 * | 1/2001 | Hebblewhite et al. | 439/341 |
| 6,341,218 B1 * | 1/2002 | Poplawsky et al. | 455/569.1 |
| 6,443,343 B2 * | 9/2002 | Kamiya | 224/269 |
| 6,762,585 B2 * | 7/2004 | Liao | 320/107 |
| 6,848,662 B2 * | 2/2005 | Paramonoff et al. | 248/309.1 |

(Continued)

FOREIGN PATENT DOCUMENTS

DE    196 52 826 A1    6/1998

(Continued)

*Primary Examiner*—Sujatha Sharma
(74) *Attorney, Agent, or Firm*—Matthias Scholl P.C.; Matthias Scholl

(57) ABSTRACT

A device holder (1) for portable electronic devices, in particular for telephone devices (18), to be connected to a hands-free-speaker device on board of motor vehicles, with electric contact members on the receiving side (2") of the device holder (1) to be connected to corresponding contact members of the electronic device, with a drawer (4) swiveling about the drawer axis (7) and having side walls (2', 3), and with holding dogs (14', 14") formed in the corners of the drawer for reaching over the segments of the electronic device, with the drawer (4) swivel-seated in the device holder having at least one contact plug (5) to be seated movably throughout a hole in the receiving side (2"), which contact plug is integrated with a rider (6), and the rider (6) is seated rotatably in the housing (12) of the device holder (1), with the rider axis (8) of the rider (6) and the drawer axis (7) in the housing (12) of the device holder (1) going parallel to each other and being displaced from each other by a distance, and with the rider (6) freely sliding by means of a slide-shoulder into a cavity (11) of the guide-rail (10) running across the drawer axis (7) under the bottom of the drawer (4), and letting itself be guided along the swinging bottom of the drawer (4).

20 Claims, 4 Drawing Sheets

U.S. PATENT DOCUMENTS

Figure 1:
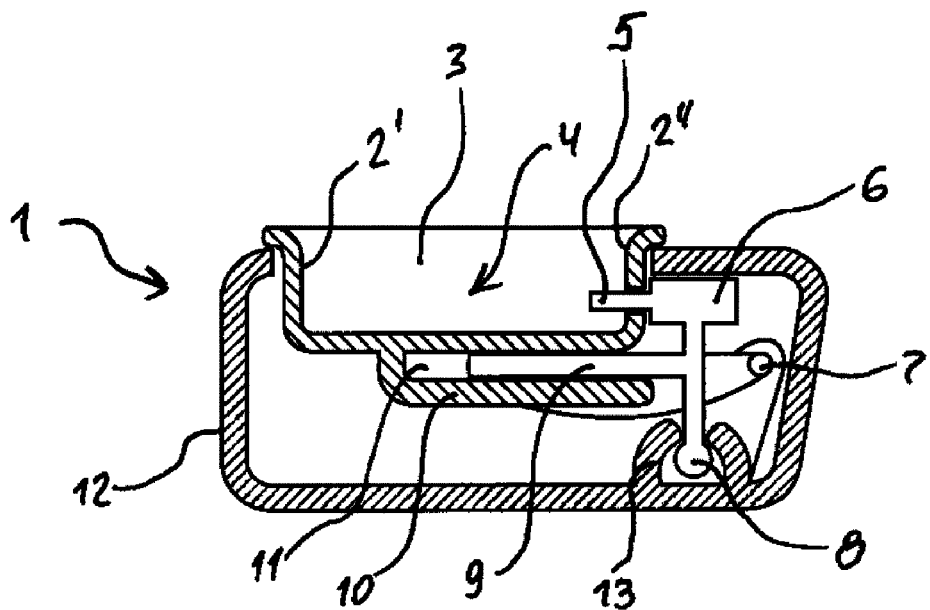
Figure 1:
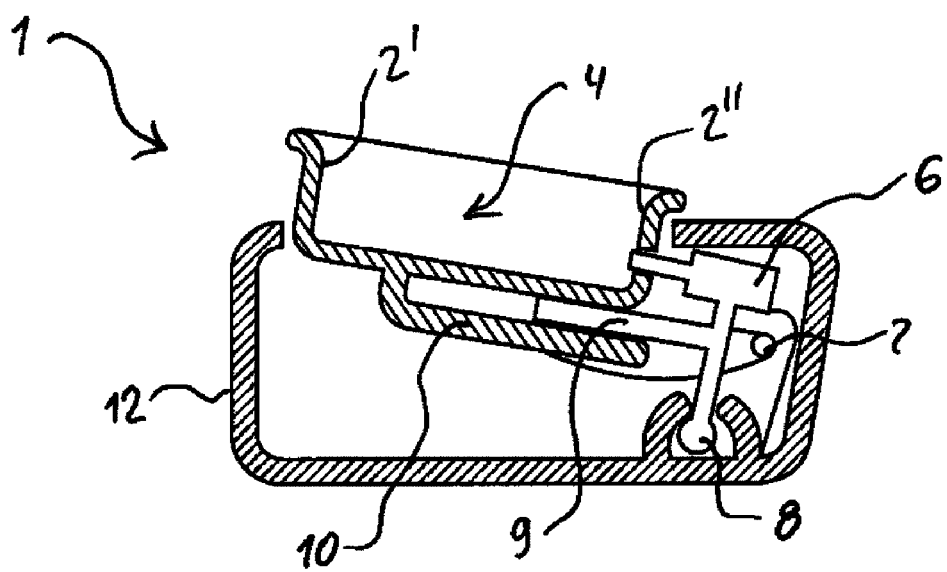

| | | | |
|---|---|---|---|
| 7,162,281 B2 * | 1/2007 | Kim | 455/575.1 |
| 7,270,435 B2 * | 9/2007 | Lin | 362/88 |
| 2007/0243731 A1 * | 10/2007 | Im | 439/131 |
| 2008/0142651 A1 * | 6/2008 | Tomasini et al. | 248/176.1 |

FOREIGN PATENT DOCUMENTS

| | | |
|---|---|---|
| DE | 199 46 746 C2 | 8/2001 |

* cited by examiner a)

b)

DEVICE CRADLE EQUIPPED WITH MOVING PLUG

The invention concerns a device holder for portable electronic devices, especially for mobile telephones, to be connected to a free speaking device on a motor vehicle, with electric contact elements on a receiving side of the device holder to be connected to corresponding contact elements of the mobile telephone, and with holding dogs for reaching over the segments of the electronic device.

There are available some telephone holders wherein a female contact of the telephone is inserted onto a contact plug of the telephone holder and then the telephone is pressed into the holder und whereby it activates a snap mechanism mostly by means of its upper edge and gets snapped into a holding fixture. In order to decrease the bending stress of the contact elements holders have been developed which are split and the contact plug together with a part of the holding fixture, in which it is standing rigidly, is swiveled out of the holding fixture by an angle. Thereby the phone can, in one-dimensional movement, be put on the contact plug and only afterwards the snapping movement takes place together with a rotatably seated part of the holding fixture, and during this movement the contacts are not strained any more because they have already been inserted into each other. Based on this principle it is possible to imagine either a vertical arrangement of the telephone which occurs mostly or a lateral solution if the arrangement of the female contact to the side of the phone requires it. These known solutions are connected with the problem of the mechanical strain exerted on the contact elements and as well, if the contact plugs go lower, with the increasing problem of a contact plug jammed by the female contact.

Another known arrangement of the phone holder solves the same problem by the fact that the housing of the phone holder split into two parts consists of the sub-housings to be pushed into each other. When the holder is open, the phone goes into with its whole length without any problem and can be inserted onto the contact plug manually. Then it is just enough to activate manually one of the two movable holder-parts and push them together, whereby a snap-mechanism locks the holder. In addition, the user has to manually make sure the contact elements meet with each other exactly enough and the holder is snap-locked in place by means of another manual movement. Mishandling does happen very often.

The task of the invention is to offer an essentially improved device-holder for electronic devices in particular for mobile phones, wherein the guiding, contacting and fastening of the electronic device is improved for sure and wherein especially the plug-type connection takes place automatically and reliably.

The task of the invention is solved in its first preferred embodiment based on the remarks of the claim 1, wherein the electronic device is put into a shell-type drawer which is swiveled out of the holding-fixture by a limited angle when the device-holder is in an opened state. For this, the shell-type drawer is rotatably seated around an axis, pressed out of the holding-fixture by means of a spring-mechanism and released out of a snap-mechanism by activating an unlock button.

The swivel axis of the device-holder can lie both on the long, mostly vertical, or the short, mostly horizontal, side of the electronic device i.e. where the female contact is. There is provided a hole in the swinging drawer, through which a corresponding contact plug can be led into and out of the drawer. The contact plug is integrated with a rider which is also situated rotatably around its own axis. The swivel axes of the drawer and the rider are running parallel and are displaced from each other by a distance and so the rider is taken and guided by the rotation of the drawer because it (rider) has a sliding shoulder at its disposal for this, by means of which it (rider) goes into a guide-rail under the bottom of the drawer. Thanks to the geometry of the arrangement we have a relative movement of the rider along the bottom of the drawer so the contact plug can be moved into a hole of the side wall of the drawer when the latter is swung out and go into the drawer to its maximum length when the latter is closed. When, in an opened position of the drawer, an electronic device has been inserted, the contact plug, while the drawer is closed, is being guided into the female contact of the device with most exactness without any danger of its getting jammed. A preferred embodiment of the spring mechanism is realized so that the spring pushes the drawer and the rider apart from each other because whereby the quantity of mechanical parts needed gets decreased.

In addition, after the contact plug has been put into the female contact of the electronic device, the holding dogs, formed as faces in the corners of the shell-like drawer, prevent the inserted electronic device from its being fallen out. On order that the inserted device does not fall out also when vibrations and shocks occur in mobile vehicles, there is provided in another advantageous embodiment of the invention at least one snapping lock-bolt on the opposite side of the device, which snapping lock-bolt will lock simultaneously with the interlocking mechanism and embrace the device on at least one of its edges. The unlock button acts, while it does unlock, onto the device lock-bolt and onto the snap-mechanism of the drawer at the same time.

The connection of an external aerial to a phone is carried out by one of the contacts in the contact plug or alternatively through an additional aerial plug. This aerial plug is placed either on the same side of the phone or on its back surface and gets connected by plugging the phone into the drawer.

In the course of the following, the invention will be presented based on an advantageous embodiment example of the invention. The similar parts or the parts having the same effect will be identified by same reference signs.

Figure 2:
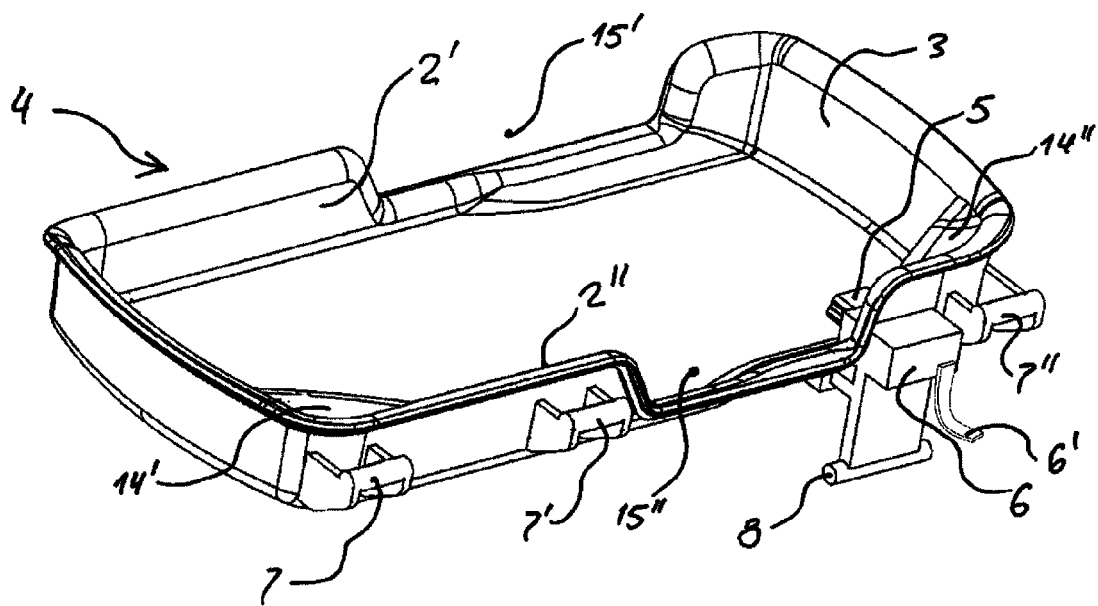
Figure 3:
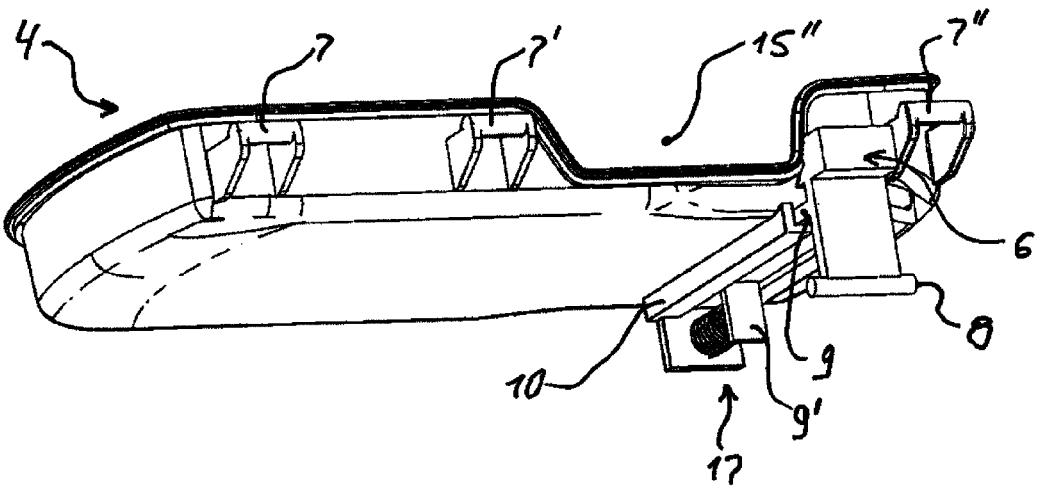
Figure 4:
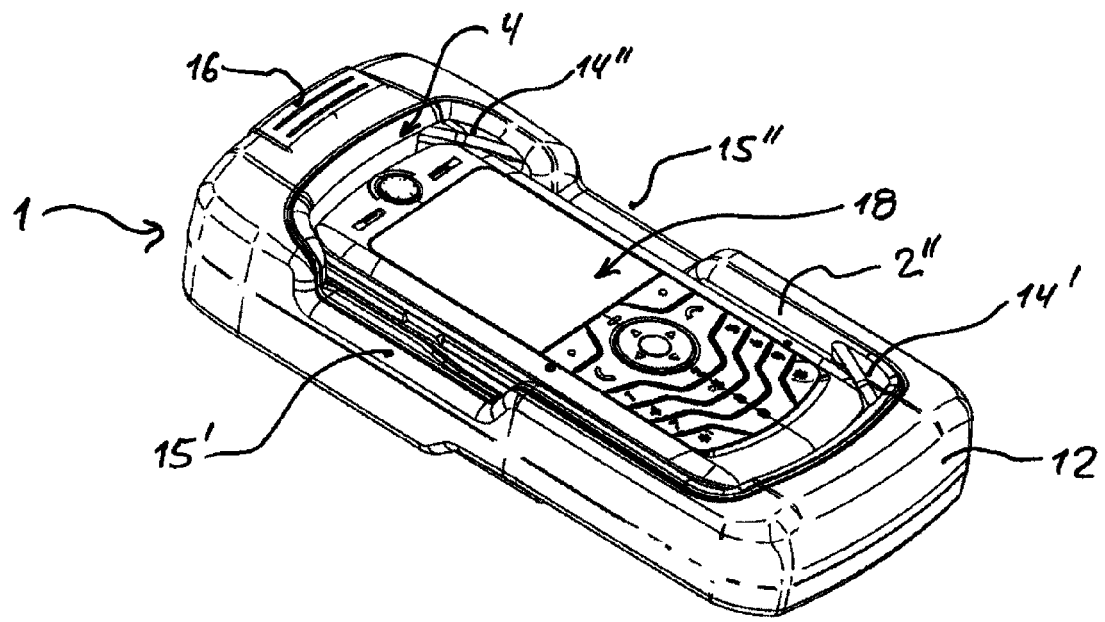
Figure 5:
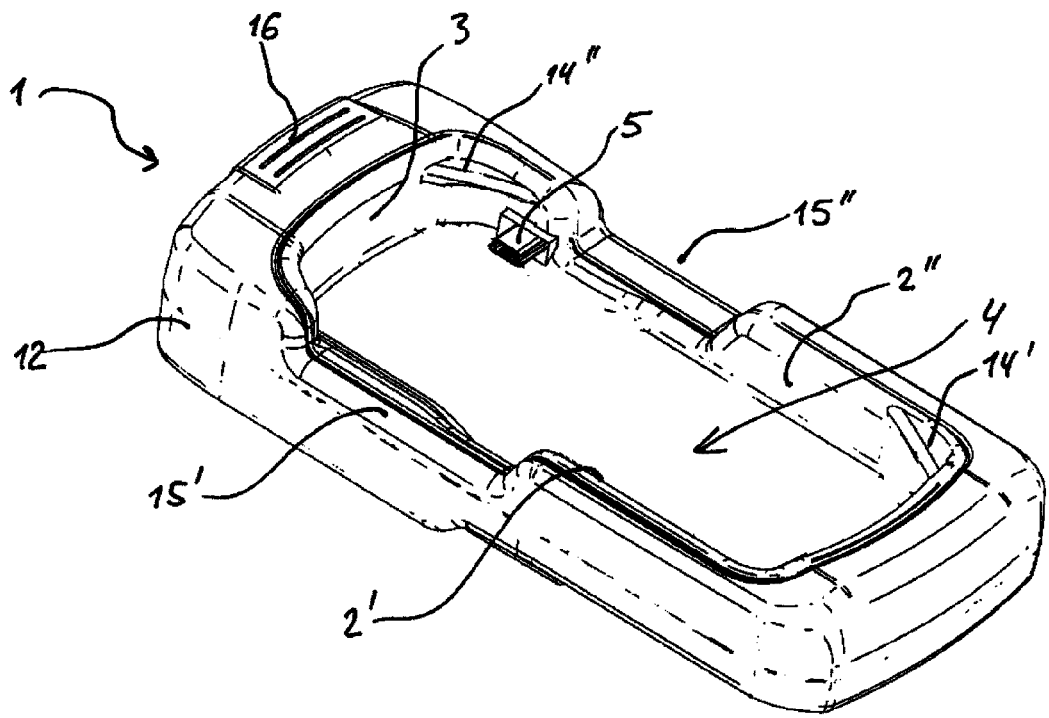
Figure 6:
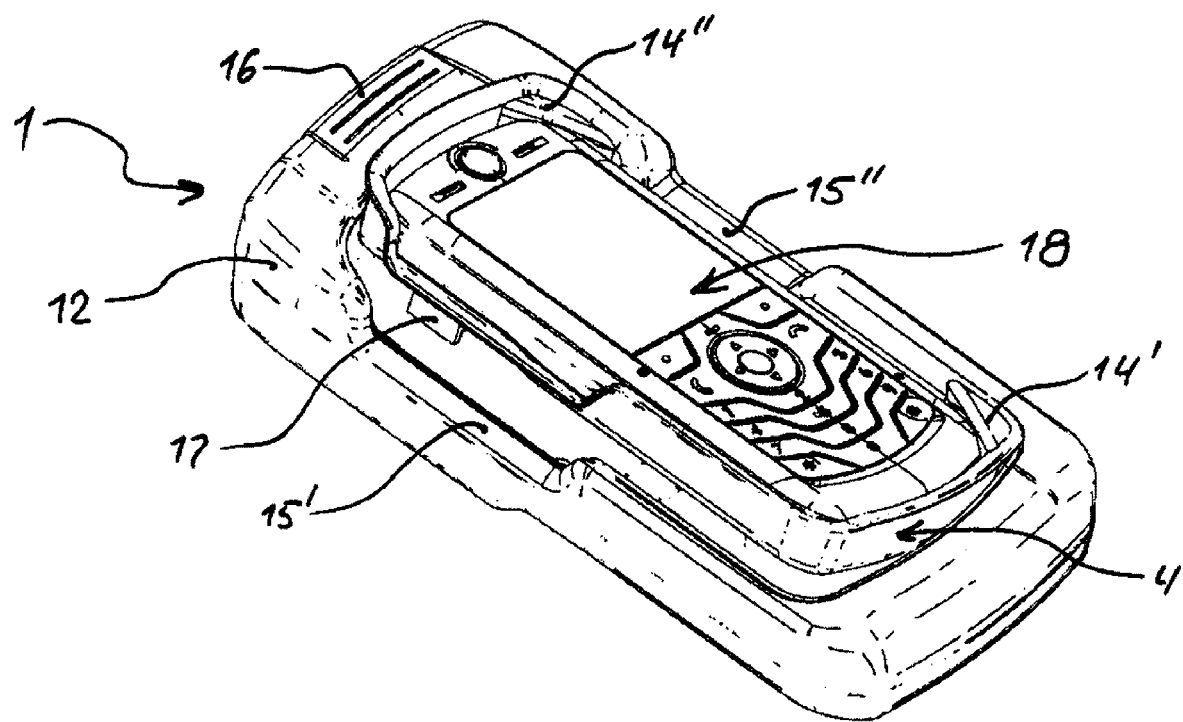

FIG. 1 shows a section through a first advantageous embodiment forms of the invention FIG. 2 shows the drawer with a movable contact plug FIG. 3 the drawer as it is seen from its bottom FIG. 4 shows the holder with the phone put in and the drawer closed FIG. 5 shows the holder with the drawer closed FIG. 6 shows the holder with the phone put in and the drawer opened In FIG. 1 we can see a section through a first advantageous embodiment of the invention. Under a) we can see a device holder 1 comprising a housing 12 and a rider 6 seated on a hinge which rider, by means of a sliding shoulder 9 forming with it a unity, is guided in a guiding rail 10 in the drawer 4 rotatably seated, with the help of the drawer axis 7, in the housing 12. The sliding rail of the sliding shoulder 9 under the bottom of the drawer 4 is provided with a guiding rail 10 and with a cavity 11 formed by it.

As far as the drawer 4 is concerned, it is rotatably seated on corresponding, not shown, hinges with its axis 7 and therefore it can be swiveled by an angel out of the housing 12 of the device holder 1. The drawer 4 is supported by means of a simple, not shown, spring mechanism from the housing 12 to the outside and is fastened by a locking mechanism, not shown in the picture, when the drawer 4 is in a closed state.

Under b) we can see the device holder 1 as being opened and in contrast to the picture under a) we can see, that, in an opened state of the drawer 4, the rider 6 together with its sliding shoulder 9 has been pulled out of the guiding rail 10. This movement of the rider 6 together with the contact plug 5 electrically connected on it is driven by the rotation of the drawer 4 and originates by virtue of the displacement of the axes of the rider 6, i.e. rider axis 8, and drawer axis 7, and of the geometry of the sliding shoulder 9 and the guiding rail 10 as well. The contact plug 5 has been thereby put into in the hole of the receiving side 2" of the drawer. In this opened state, a phone 18 can be put into the drawer easily.

The solution as presented can be executed for the phones to be installed either laterally or on the upper edge.

In FIG. 2, the drawer 4 is presented in perspective view. We can see that the drawer axis 7 is executed in three part-axes 7, 7' and 7". Further we can see recesses 15' and 15" on the side wall 2' and on the receiving side 2", which are supposed to make it possible to take the phone out of the drawer 4 and put it back easily. The holding dogs 14' and 14" are formed as surfaces arranged parallel to the bottom of the drawer 4 and are positioned in the corners of the drawer 4 on the receiving side 2". The phone 18 is introduced under these holding dogs 14' and 14" askew laterally and fixed in the corners in order not to fall out.

The phone 18 has to be pushed under the holding dogs 14' and 14" in an a little slanted position with the drawer (4) being opened. When the user pushes the drawer 4, with the phone put on, rotatably into the housing 12 of the device holder 1, against the resistance of the spring mechanism 17 supporting the drawer 4, then the contact plug 5 goes surely and correctly directed into the female contact of the phone 18. Its/of the contact plug/movement is finished when the drawer 4 has been pushed into the housing 12 and fastened by means of a locking mechanism.

The drawer 4 is formed in the form of a bathtub by the side wall 2', the receiving side 2", the side wall 3, a wall opposite to the latter and by the bottom.

The cable connector 6' makes, thanks to elasticity of the cable, the connection between the contact plug 5 integrated with the rider 6 and the communication connector placed in the housing 12. The communication connector in the housing 12 leads to an internal and external electronics for instance to a free-speaking-device.

In FIG. 3 we can see the drawer 4 in perspective view from below, although above all an advantageous embodiment of the spring-mechanism 17 comes to light, which the spring-mechanism is responsible for the fact that the drawer 4 is constantly pushed out of the housing 12. The spring of the spring-mechanism 17 pushes against the spring-surface 9' of the sliding shoulder 9 and in this way there arises a force which acts in the direction of the guiding rail 10, which force constantly gives the drawer 4 a torque around the drawer axis 7.

The housing 12 constitutes thus a stop for the drawer 4, which stop limits the swivel angle. The sliding shoulder 9 together with the spring surface 9' and the guiding rail 10 are thus visibly fixed on the bottom of the drawer 4.

In FIG. 4 we can see the device holder 1 with a phone 18 put on. Thus the drawer 4 is snapped in the housing 12 and can be released by activating the unlock button 16. The phone 18 is, with its corners on the receiving side 2", plugged in under the holding dogs 14' and 14". In addition to that, the phone is supported by its contact plug 5 which is plugged into its socket, not shown in the picture.

In FIG. 5 we can see the device holder 1 without phone but with the drawer 4 closed and the contact plug being fully pushed out. The recesses 15' and 15" are omitted/carried out ?/either on the side walls of the drawer and on the side walls of the housing 12 as well for operating the phone to push it in or take it out.

In FIG. 6 we can see the device holder 1 according to the invention with the phone 18 put in and the drawer 4 being opened. Partly we can see the spring mechanism 17 under the drawer 4. With this position of the opened drawer 4, we can catch the phone through the recesses 15' and 15" using the fingers and then take it out by rotating it a little under the holding dogs 14' and 14".

LIST OF REFERENCES 1 device holder
2' side wall
2" receiving side
3 side wall
4 drawer
5 contact plug
6 rider
6' cable connector
7 drawer axis
8 rider axis
9 sliding shoulder
9' spring surface
10 guiding rail
11 cavity
12 housing
13 hinge
14' 14" holding dogs
15' 15" recess
16 unlock button
17 spring mechanism
18 phone

The invention claimed is:

1. The device holder (1) for portable electronic devices, especially for phones (18), to be connected to a hands free-speaking-device on motor vehicles, comprising electric contact elements on a receiving side (2") of the device holder (1) to be connected to corresponding contact elements of the electronic device, a drawer (4) swiveling about its axis (7) with side walls (2', 3) standing vertically to the bottom of the drawer (4), and holding dogs (14', 14") formed in the corners of the drawer for reaching the segments of the electronic device, characterized in that the drawer (4) swivel-seated in the device holder (1) has at least one contact plug (5) seated movably through a hole in the receiving side (2"), which plug is integrated with a rider (6), and the rider (6) is seated rotatably in the housing (12) of the device holder (1), with the axis (8) of the rider (6) and the drawer axis (7) in the housing (12) of the device holder (1) being parallel to each other and being displaced from each other by a distance, and the rider (6) engages freely sliding, by means of a slide-shoulder, into a cavity (11) of the guide-rail (10) running across the drawer axis (7) under the bottom of the drawer (4), and lets itself be guided along the swiveling bottom of the drawer (4).

2. The device holder (1) according to claim 1 characterized in that the drawer (4) has a side wall (2') facing the receiving side (2") and both of them have a recess (15', 15") each in their middle areas.

3. The device holder (1) according to claim 1 characterized in that the contact plug (5) has at least two contacts.

4. The device holder (1) according to claim 1 characterized in that the swiveling drawer (4) is pushed out of the housing (12) of the device holder (1) by means of a spring mechanism (17).

5. The device holder (1) according to claim 1 characterized in that the holding dogs (14', 14") which are to be found in the corners of the drawer (4) are formed as surfaces.

6. A device holder for a portable electronic device, especially for a mobile phone, to be connected to a hands free-speaking-device in a motor vehicle, comprising:
- a drawer having a side wall, a receiving side with a hole, a bottom, a drawer axis, and a guiding rail, said guiding rail being disposed under the bottom of the drawer and forming a cavity between the guiding rail and the bottom of the drawer;
- a rider having a sliding shoulder, a rider axis, and a contact plug to be connected to a corresponding contact element of the portable electronic device;
- a pair of holding dogs formed at two opposite corners of said drawer and adapted to prevent the portable electronic device from falling out of the drawer; and
- a housing having a hinge for said rider axis;

wherein
- said drawer is swivel-seated in said housing, swivels about said drawer axis, and moves between an opened state and a closed state;
- said rider is seated rotatably in said housing, and said rider is rotatably engaged with said hinge;
- said sliding shoulder engages freely sliding into and out of said cavity formed between the guiding rail and the bottom of the drawer, said sliding shoulder being guided along the bottom of the drawer;
- said rider axis and said drawer axis are displaced from each other by a distance; and
- said contact plug is inserted through said hole as said drawer moves from said open state to said closed state.

7. The device holder of claim 6, wherein said holding dogs are formed at the receiving side of said drawer.

8. The device holder of claim 6, wherein said drawer undergoes rotation and translation with respect to said housing as said drawer swivels between said open state and said closed state.

9. The device holder of claim 6, wherein both said receiving side and said side wall of said drawer undergo rotation and translation with respect to said housing as said drawer swivels between said open state and said closed state.

10. The device holder of claim 8, wherein the bottom of the drawer is disposed in parallel to the bottom of the housing in a closed position of the device holder the bottom of the drawer is disposed in a slanted position to the bottom of the housing in an open position of the device holder.

11. The device holder of claim 6, wherein a first recess is formed in said side wall and a second recess is formed in said receiving side.

12. The device holder of claim 6, wherein said contact plug has at least two contacts.

13. The device holder of claim 6 further comprising a spring mechanism, wherein said drawer is pushed out of said housing by said spring mechanism.

14. The device holder of claim 6, wherein said holding dogs are formed as surfaces.

15. The device holder of claim 6, wherein recesses are formed in said housing and positively align with recesses formed in said drawer when said drawer is in said closed state.

16. The device holder of claim 6, wherein said rider comprises further a cable connector made of flexible cable, and said cable connector is directly connected to said contact plug.

17. The device holder of claim 6 further comprising an interlocking mechanism and an unlock button, wherein said drawer is fixed to said housing in said closed state by means of said interlocking mechanism, and said interlocking mechanism is released by pressing said unlock button.

18. The device holder of claim 6 further comprising a stop for said drawer, said stop limiting a swiveling angle of said drawer.

19. The device holder of claim 17 further comprising an additional interlocking mechanism, said interlocking mechanism snap-locking the mobile phone in place, said additional interlocking mechanism being unlocked by means of said unlock button.

20. The device holder of claim 16, wherein said contact connector is an aerial connector.

* * * * *